US011279195B2

(12) United States Patent
Ruemelin et al.

(10) Patent No.: US 11,279,195 B2
(45) Date of Patent: Mar. 22, 2022

(54) INDIVIDUAL ACTIVE TORSIONAL SPRINGS

(71) Applicant: Honda Motor Co., Ltd., Tokyo (JP)

(72) Inventors: Jacob M. Ruemelin, Columbus, OH (US); Brandon E. Ricketts, Marysville, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 140 days.

(21) Appl. No.: 16/526,963

(22) Filed: Jul. 30, 2019

(65) Prior Publication Data
US 2021/0031583 A1    Feb. 4, 2021

(51) Int. Cl.
*B60G 17/016* (2006.01)
*B60G 3/28* (2006.01)
*B60G 15/02* (2006.01)

(52) U.S. Cl.
CPC .......... *B60G 17/0162* (2013.01); *B60G 3/28* (2013.01); *B60G 15/02* (2013.01); *B60G 2202/134* (2013.01); *B60G 2204/418* (2013.01); *B60G 2400/10* (2013.01); *B60G 2400/40* (2013.01); *B60G 2400/90* (2013.01)

(58) Field of Classification Search
CPC ...... B60G 17/0162; B60G 3/28; B60G 15/02; B60G 2202/134; B60G 2202/1351; B60G 2202/135; B60G 21/0558
See application file for complete search history.

(56) References Cited

U.S. PATENT DOCUMENTS

| | | | |
|---|---|---|---|
| 7,798,498 B2 | 9/2010 | Buma | |
| 7,896,360 B2 | 3/2011 | Buma | |
| 2002/0121748 A1* | 9/2002 | Ignatius | ............. B60G 21/0556 280/5.511 |
| 2005/0264247 A1* | 12/2005 | Buma | ................ B60G 17/0157 318/432 |

(Continued)

FOREIGN PATENT DOCUMENTS

| | | | | |
|---|---|---|---|---|
| DE | 102014114860 A1 * | 4/2015 | ............... B62D 7/18 |
| DE | 10148095 B4 | 7/2017 | |

(Continued)

OTHER PUBLICATIONS

Machine Translation of EP-1958804 (Year: 2008).*

*Primary Examiner* — Paul N Dickson
*Assistant Examiner* — Kurtis Nielson
(74) *Attorney, Agent, or Firm* — Rankin, Hill & Clark LLP

(57) ABSTRACT

A suspension system for a vehicle includes at least two torsion bars, each of which are connected on their first end to respective wheel suspensions that are arranged on opposite lateral sides of the vehicle. Movement of the wheel suspensions produces torque in the respective torsion bars. Each of the torsion bars are connected on their second ends to a frame of the vehicle through a damper system. Movement of the wheel suspensions produces torque in the respective torsion bar. The damper system selectively applies resistance to the torque in the torsion bars to selectively provide active variable spring rates to the wheel suspension, which application of resistance may be coordinated amongst the various torsion bars to inhibit roll of the vehicle during a turning maneuver or to increase occupant comfort when the vehicle encounters a bump or hole.

18 Claims, 7 Drawing Sheets

(56) References Cited

U.S. PATENT DOCUMENTS

| | | | |
|---|---|---|---|
| 2006/0027990 A1* | 2/2006 | Dobson | B60G 21/073 280/124.106 |
| 2006/0192354 A1* | 8/2006 | Van Cayzeele | B60G 17/0162 280/5.506 |
| 2007/0150144 A1* | 6/2007 | Yasui | B60G 17/0165 701/38 |
| 2008/0091317 A1* | 4/2008 | Green | B60G 21/0555 701/38 |
| 2008/0111326 A1* | 5/2008 | Taneda | B60G 17/0162 280/5.511 |
| 2009/0008887 A1* | 1/2009 | Buma | B60G 21/0555 280/5.511 |
| 2009/0091093 A1* | 4/2009 | Urababa | B60G 17/0162 280/5.511 |
| 2009/0091094 A1* | 4/2009 | Sano | B60G 21/0555 280/5.511 |
| 2009/0152824 A1* | 6/2009 | Grieshaber | B60G 17/0162 280/5.509 |
| 2009/0224493 A1* | 9/2009 | Buma | B60G 17/0162 280/5.511 |
| 2010/0138108 A1* | 6/2010 | Kajino | B60G 17/018 701/38 |
| 2010/0164189 A1* | 7/2010 | Buma | B60G 17/0161 280/5.521 |
| 2010/0276896 A1* | 11/2010 | Sano | B60G 17/0152 280/5.509 |
| 2011/0278811 A1* | 11/2011 | Ohletz | B60G 21/0555 280/124.106 |
| 2014/0224606 A1* | 8/2014 | Baales | B60G 21/0558 188/314 |
| 2015/0108732 A1* | 4/2015 | Luttinen | B60G 11/182 280/93.512 |
| 2017/0096041 A1* | 4/2017 | Dempsey | B60G 17/025 |
| 2017/0349024 A1* | 12/2017 | Takashima | B60G 21/0555 |
| 2018/0281547 A1* | 10/2018 | Koumura | B60G 17/0162 |
| 2019/0308611 A1* | 10/2019 | Lee | B60W 40/114 |
| 2020/0376918 A1* | 12/2020 | Romelhardt | B60G 21/0558 |

FOREIGN PATENT DOCUMENTS

| | | | |
|---|---|---|---|
| EP | 1958804 A1 * | 8/2008 | B60G 17/025 |
| EP | 1958804 B1 | 3/2010 | |
| EP | 2322366 B1 | 3/2014 | |
| JP | 2009096366 A * | 5/2009 | B60G 17/0182 |
| KR | 20070032138 A | 3/2007 | |
| KR | 101364451 B1 | 2/2014 | |
| WO | WO-2010083876 A1 * | 7/2010 | B60G 17/025 |
| WO | WO-2018206209 A1 * | 11/2018 | B60G 17/019 |

* cited by examiner

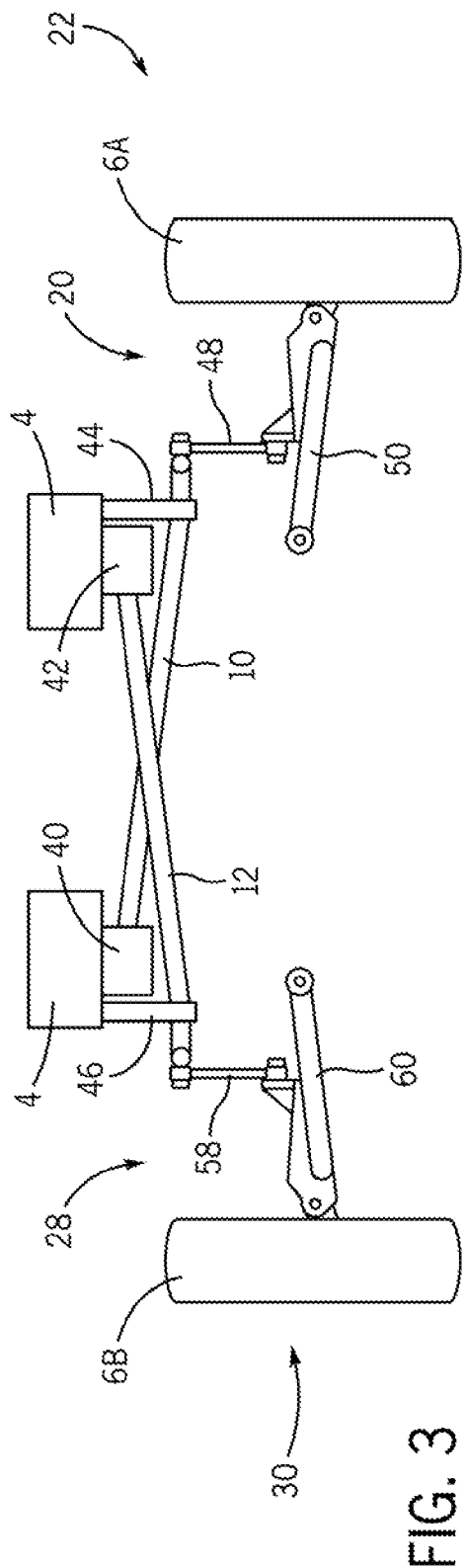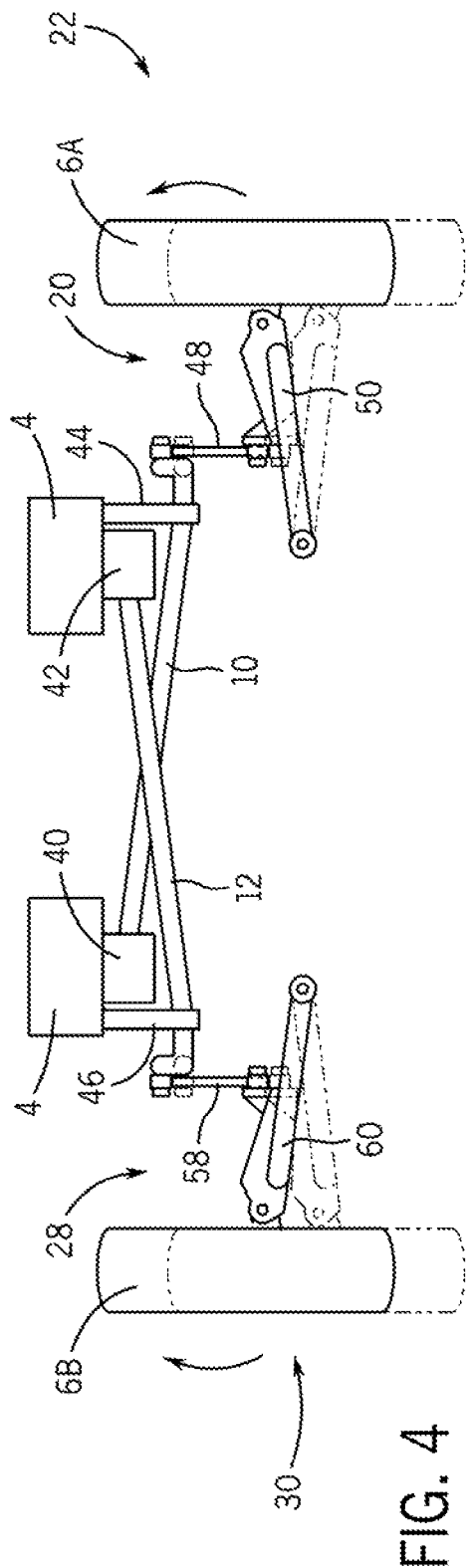

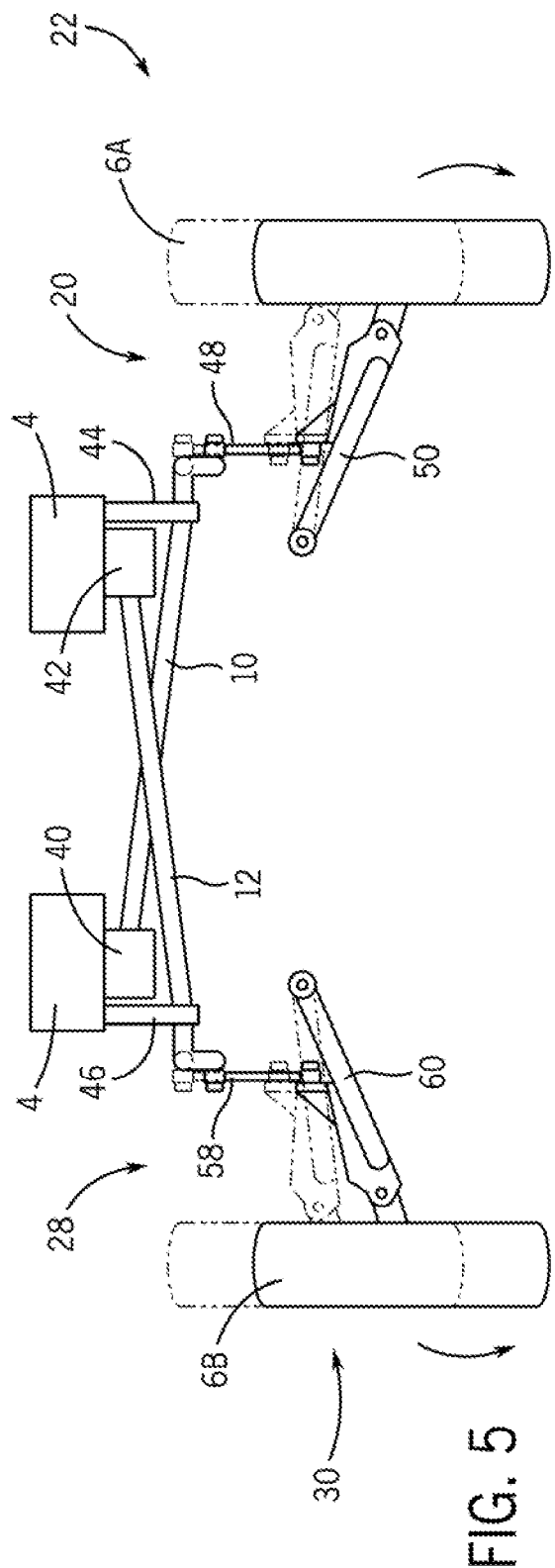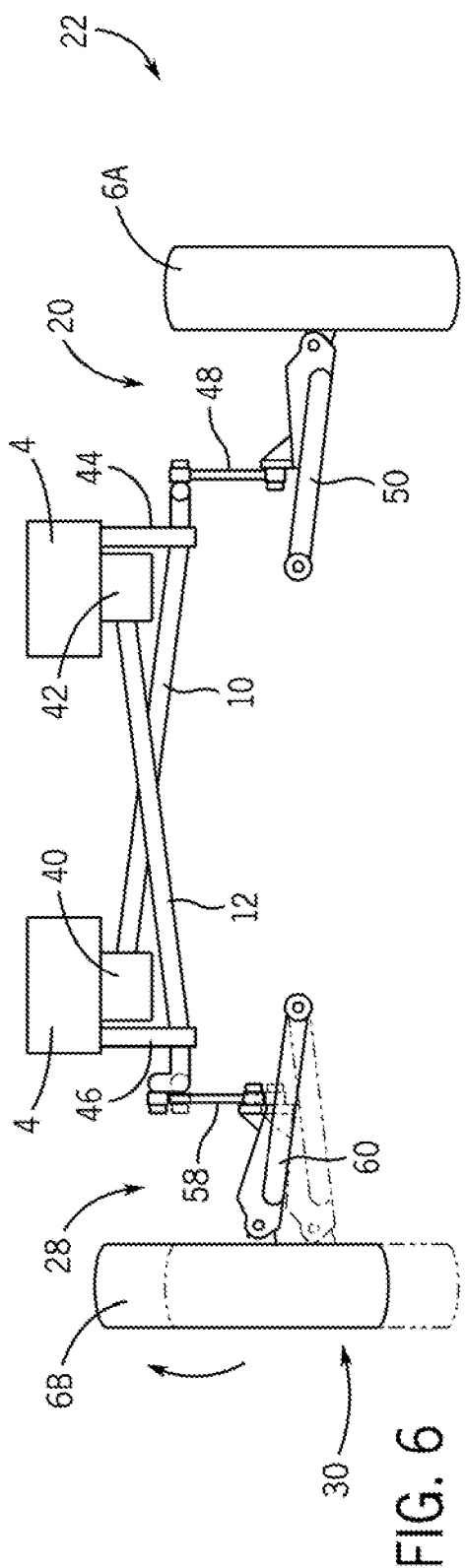

INDIVIDUAL ACTIVE TORSIONAL SPRINGS

BACKGROUND

Stabilizer bars are one of the most common methods for combating vehicle roll when performing a turning maneuver. Automobiles and off road vehicles will generally use a single torsional bar that will connect both left and right suspensions systems together. The stabilizing bar can be included in either of the longitudinal front or rear axles of the vehicles.

Current torsional sway bars can help reduce vehicle roll, but they also limit individual wheel articulation. This can greatly reduce the overall comfort of an occupant of the vehicle when the vehicle experiences a single wheel suspension event, because such an event will cause both wheels to move together, limiting the overall articulation a single wheel can experience. This in turn can cause the suspension and vehicle dynamics to become upset and reduce overall suspension performance. This also limits the maximum allowable sway bar stiffness, and will generally lead to a compromise in both the control of vehicle roll versus handling performance.

Additionally, suspensions that are expected to carry heavy loads or those used in performance applications will often include heavier/stiffer springs to compensate for the extreme conditions experienced so that the vehicle does not move to the bottom of its suspension stroke. This requires a spring with a proper stiffness to be used for the expected use of the vehicle. However, this use of the vehicle is not always constant, and the vehicle may be used in other varying applications with higher or lower loading conditions. In these cases, springs that are too hard or too soft provide a suspension that fails to properly isolate the vehicle from the road. There is currently no way to manipulate the vehicles spring rate, which causes the required use of stiffer springs to account for the most extreme use. This stiffer spring causes increased movement of the frame when the wheel encounters a bump or hole, and thus causes a reduction of overall comfort to an occupant of the vehicle. There can also be suspension events that can occur where a stiffer spring rate is desired but cannot be realized due to a compromise in performance of the suspension if a stiffer spring were used.

BRIEF DESCRIPTION

According to one aspect, a suspension system for a vehicle includes a first torsion bar, a second torsion bar, and a damper system. A first end of the first torsion bar is connected to a first wheel suspension of the vehicle, such that movement of the first wheel suspension in a first wheel suspension stroke produces torque in the first torsion bar. A second end of the first torsion bar is connected to the damper system. A first end of the second torsion bar is connected to a second wheel suspension of the vehicle, such that movement of the second wheel suspension in a second wheel suspension stroke produces torque in the second torsion bar. A second end of the second torsion bar is connected to the damper system. The damper system selectively applies resistance to the torque in the first and second torsion bars to selectively provide active variable spring rates to the first and second wheel suspensions.

According to another aspect, a vehicle includes a frame, a first wheel suspension arrange on a first lateral side of the frame, a second wheel suspension arranged on a second lateral side of the frame opposite from the first lateral side, and a suspension system connecting the first wheel suspension and the second wheel suspension to the frame. The suspension system includes a first torsion bar, a second torsion bar, and a damper system. A first end of the first torsion bar is connected to the first wheel suspension of the vehicle, such that movement of the first wheel suspension in a first wheel suspension stroke produces torque in the first torsion bar. A second end of the first torsion bar is connected to the damper system. A first end of the second torsion bar is connected to the second wheel suspension of the vehicle, such that movement of the second wheel suspension in a second wheel suspension stroke produces torque in the second torsion bar. A second end of the second torsion bar is connected to the damper system. The damper system selectively applies resistance to the torque in the first and second torsion bars to provide active variable spring rates to the first and second wheel suspensions.

BRIEF DESCRIPTION OF THE DRAWINGS

FIG. 3 is a front view of a rear portion of a suspension system according to the present subject matter.

FIG. 4 is another front view of the rear portion of the suspension system of FIG. 3.

FIG. 5 is another front view of the rear portion of the suspension system of FIG. 3.

FIG. 6 is another front view of the rear portion of the suspension system of FIG. 3.

DETAILED DESCRIPTION

Figure 1:
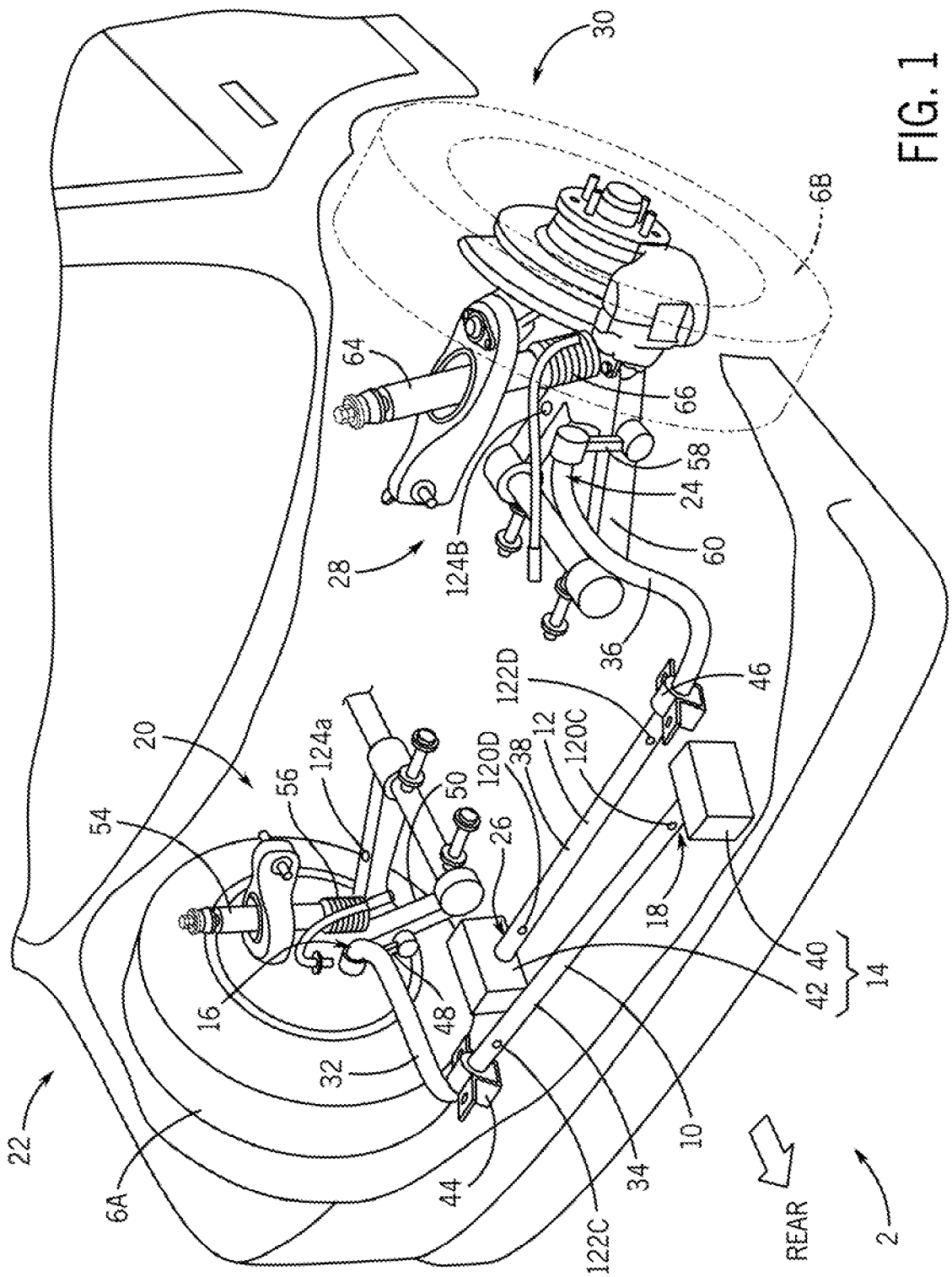
FIG. 1 is a perspective cutaway view of a rear of a vehicle including a suspension system according to the present subject matter.

The present subject matter provides a suspension system including individual active torsional springs that collectively act as a sway bar for a vehicle, as well as work to provide an active variable spring rate to the vehicle suspension. Each torsional spring may operate physically independent from the other(s), but may work in conjunction with all other torsional springs to control vehicle dynamics through control logic.

The suspension system includes at least two torsion bars, each operatively connected at a first end to a wheel suspension on only one lateral side of the vehicle. The opposite second end of each torsion bar may be connected to the vehicle frame through a damper system. Movement of the wheel suspensions in their respective suspension strokes (i.e. the distance between maximum compression and full extension of the wheel suspensions) produced torque in the torsion bars. The damper system selectively applies resistance to this torque produced in the torsion bars. The suspension mechanisms on the lateral sides (i.e. left and right sides) of the vehicle may have their own torsion bar operatively associated therewith, and the suspension system may gather measurement data taken from each of the torsion bars. This gathering of measurement data may be accomplished using angle encoders that take measurements of angular positions of the torsion bars in order to determine the location of the suspension in a suspension stroke, as well as the overall torque being applied to the torsion bars. The system may use these measurements to control the damper system via a control logic to provide a coordinated resistance to the torque in the torsion bars. The system may be used in conjunction with conventional suspension components, including for example for example, tires, wheels, linkages, springs, shocks, and struts, and may apply the resistance to inhibit vehicle roll and/or to provide an active variable spring rate to the suspension, which may result in improve vehicle dynamics.

The control logic may cause the damper system to selectively apply resistance to torque in the torsion bars to thereby manipulate the torsion bar index and the amount that the torsion bar is allowed to move. This selectively applied resistance may inhibit movement of the torsion bars, and therefore allow the torsion bars to collectively function as a very stiff sway bar to inhibit vehicle roll, e.g. during a turning event. When no resistance is applied to the torque in the torsion bars, the torsion bars may be allowed to move freely to allow for full wheel suspension articulation within a suspension stroke and thus improving overall comfort, e.g. during straight line movement of the vehicle.

The system may be used to apply resistance to torque in the torsion bars when the suspension is subjected to a large impact, for example when a vehicle tire encounters a bump or hole in the ground during travel. This functioning may allow the suspension system to assist the primary shocks/struts to create a variable suspension rate for the vehicle, wherein the system may apply no resistance to torque in the torsion bar to allow for a softer primary spring rate, but may apply a supplemental resistance to help absorb large impacts. This operation of the suspension system via operation of the control logic may help to improve both occupant comfort and performance of the vehicle.

Referring now to the figures, a vehicle 2 includes a frame 4, wheels 6, and a suspension system connecting the wheels 6 to the frame 4. The suspension system includes a first torsion bar 10, a second torsion bar 12, and a damper system 14.

The first and second torsion bars 10, 12 are operatively associated with a pair of rear wheels 6A, 6B of the vehicle 2, which wheels may be arranged on respective opposite lateral sides of the vehicle 2 (e.g. a driver's and passenger's sides of the vehicle 2) and may be longitudinally aligned with one another (i.e. rear axle).

The first torsion bar 10 has a first end 16 and a second end 18 distal from the first end 16. The first end 16 of the first torsion bar 10 may be attached to a first wheel suspension 20 on a first lateral side 22 (e.g. driver's side) of the vehicle 2, such that movement of the first wheel suspension 20 in a first wheel suspension stroke produces torque in the first torsion bar 10.

The second torsion bar 12 has a first end 24 and a second end 26 distal from the first end 24. The first end 24 of the second torsion bar 12 may be attached to a second wheel suspension 28 on a second lateral side 30 (e.g. passenger's side) of the vehicle 2 opposite from the first lateral side 22, such that movement of the second wheel suspension 28 in a second wheel suspension stroke produces torque in the second torsion bar 12.

The first torsion bar 10 may have a general L-shape including a short section 32 including the first end 16, and a long section 34 including the second end 18. The first torsion bar 10 may be connect to the first wheel suspension 20 at the first end 16, such that movement of the first wheel suspension 20 in a first wheel suspension stroke (e.g. the up and down movement indicated by arrows in FIGS. 4, 5, 8, 9) produces the torque in the first torsion bar 10, and specifically in the long section 34 of the first torsion bar 10.

The second torsion bar 12 may have a general L-shape including a short section 36 including the first end 24, and a long section 38 including the second end 18. The second torsion bar 12 may be connect to the second wheel suspension 28 at the first end 24, such that movement of the second wheel suspension 28 in a second wheel suspension stroke (e.g. the up and down movement indicated by arrows in FIGS. 4-9) produces the torque in the second torsion bar 12, and specifically in the long section 38 of the second torsion bar 12.

The damper system 14 may include a first resistive device 40 and a second resistive device 42, each of which may be mounted on the frame 4 of the vehicle 2. The first and second resistive devices 40, 42 may each include an electronic motor, a hydraulic damper, valving, or a clutch pack that provides resistance to torque in the first and second torsion bars 10, 12. The second end 18 of the first torsion bar 10 may be connected to the frame 4 of the vehicle 2 through the first resistive device 40. The second end 26 of the second torsion bar 12 may be connected to the frame 4 through the second resistive device 42. The first torsion bar 10 may be attached to the frame 4 by a first bearing 44 (e.g. bushing), which may be arranged on the first torsion bar 10 between the first and second ends 16, 18 of the first torsion bar 10. The second torsion bar 12 may be attached to the frame 4 by a second bearing 46 (e.g. bushing), which may be arranged on the second torsion bar 12 between the first and second ends 24, 26 of the second torsion bar 12.

The first torsion bar 10 is depicted in FIG. 1 to be connected to the first wheel suspension 20, where the first torsion bar 10 is connected via a first link rod 48 to a first control arm 50 of a first wheel 6A. The first wheel suspension 20 is further depicted to include a first strut 54 including a first spring 56. The second torsion bar 12 is depicted to be connected to the second wheel suspension 28, where the second torsion bar 12 is connected via a second link rod 58 to a second control arm 60 of a second wheel 6B. The second wheel suspension 28 is further depicted to include a second strut 64 including a second spring 66.

Figure 2:
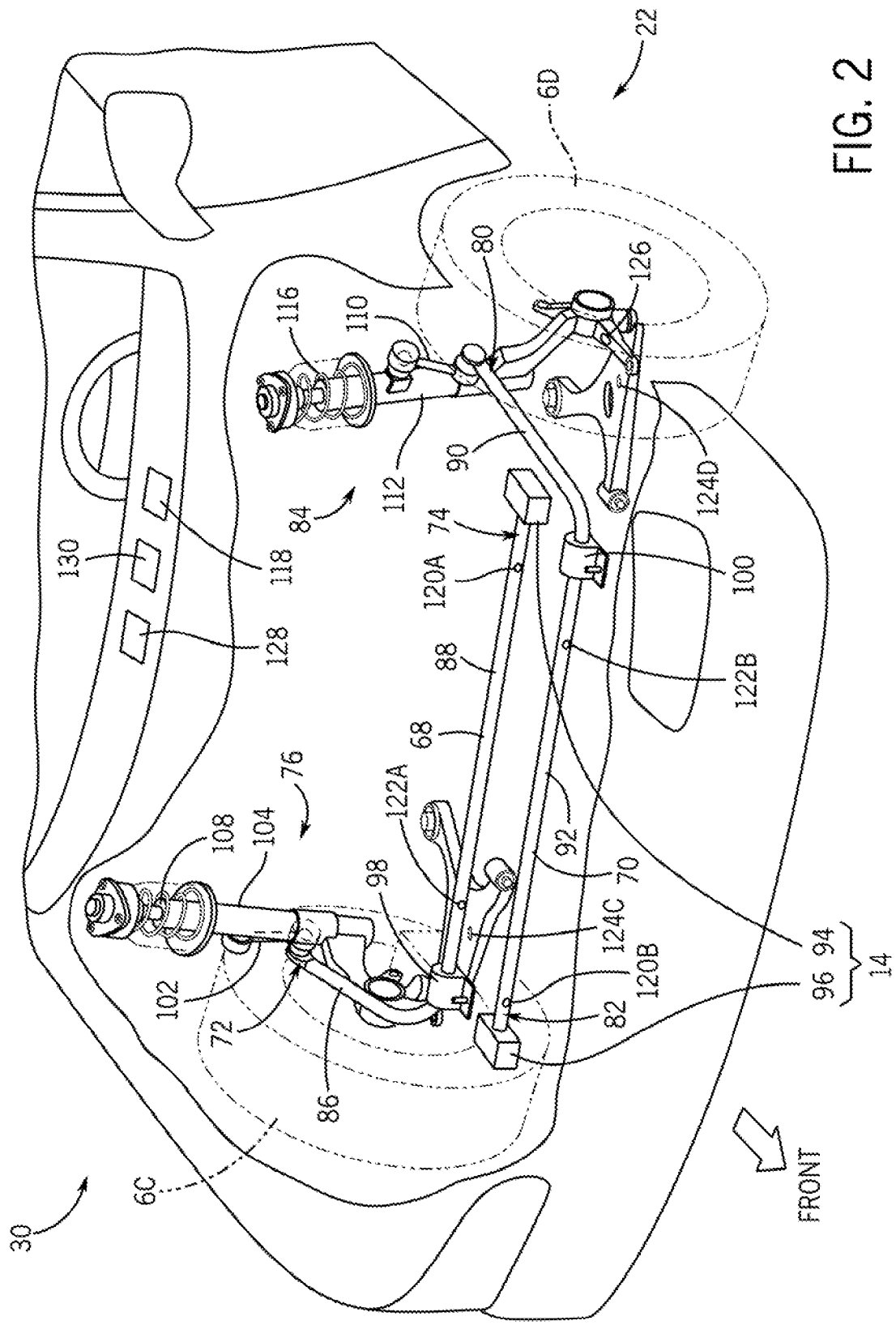
FIG. 2 is a perspective cutaway view of a front of a vehicle including a suspension system according to the present subject matter.

The suspension system may include other torsion bars operatively connected with other wheel suspensions of the vehicle 2. As depicted in FIG. 2, the suspension system may include a third torsion bar 68 and a fourth torsion bar 70 that are operatively connected with the respective two front wheels 6C, 6D of the vehicle 2, which wheels may be arranged on respective opposite lateral sides of the vehicle 2 (e.g. a driver's and passenger's sides of the vehicle 2) and may be longitudinally aligned with one another (i.e. front axles).

In particular, the third torsion bar 68 has a first end 72 and a second end 74 distal from the first end 72. The first end 72 of the third torsion bar 68 may be attached to a third wheel suspension 76 on the second lateral side 30 (e.g. passenger's side) of the vehicle 2, such that movement of the third wheel suspension 76 in a third wheel suspension stroke produces torque in the third torsion bar 68.

The fourth torsion bar 70 has a first end 80 and a second end 82 distal from the first end 80. The first end 80 of the fourth torsion bar 70 may be attached to a fourth wheel suspension 84 on the first lateral side 22 (e.g. driver's side) of the vehicle 2, such that movement of the fourth wheel suspension 84 in a fourth wheel suspension stroke produces torque in the fourth torsion bar 70.

The third torsion bar 68 may have a general L-shape including a short section 86 including the first end 72, and a long section 88 including the second end 74. The third torsion bar 68 may be connect to the third wheel suspension 76 at the first end 72, such that movement of the third wheel suspension 76 in a third wheel suspension stroke produces the torque in the third torsion bar 68, and specifically in the long section 88 of the third torsion bar 68.

The fourth torsion bar 70 may have a general L-shape including a short section 90 including the first end 80, and a long section 92 including the second end 82. The fourth torsion bar 70 may be connect to the fourth wheel suspension 84 at the first end 80, such that movement of the fourth wheel suspension 84 in a fourth wheel suspension stroke produces the torque in the fourth torsion bar 70, and specifically in the long section 92 of the fourth torsion bar 70.

The damper system 14 may include a third resistive device 94 and a fourth resistive device 96, each of which may be mounted on the frame 4 of the vehicle 2. The third and fourth resistive devices 94, 96 may each include an electronic motor, a hydraulic damper, valving, or a clutch pack that provides resistance to torque in the third and fourth torsion bars 68, 70. The second end 74 of the third torsion bar 68 may be connected to the frame 4 of the vehicle 2 through the third resistive device 94. The second end 82 of the fourth torsion bar 70 may be connected to the frame 4 through the fourth resistive device 96. The third torsion bar 68 may be attached to the frame 4 by a third bearing 98 (e.g. bushing), which may be arranged on the third torsion bar 68 between the first and second ends 72, 74 of the third torsion bar 68. The fourth torsion bar 70 may be attached to the frame 4 by a fourth bearing 100 (e.g. bushing), which may be arranged on the fourth torsion bar 70 between the first and second ends 80, 82 of the fourth torsion bar 70.

The third torsion bar 68 is depicted in FIG. 2 to be connected to the third wheel suspension 76, where the third torsion bar 68 is connected via a third link rod 102 to a third strut 104 of a third wheel 6C. The third wheel suspension 76 is further depicted to include a third spring 108 as part of the third strut 104. The fourth torsion bar 70 is depicted to be connected to the fourth wheel suspension 84, where the fourth torsion bar 70 is connected via a fourth link rod 110 to a fourth strut 112 of a fourth wheel 6D. The fourth wheel suspension 84 is further depicted to include a fourth spring 116 as part of the fourth strut 112.

The suspension system may include, and may therefore operate to improve vehicle dynamics utilizing, only the first and second torsion bars 10, 12; only the third and fourth torsion bars, 68, 70; or all of the first, second, third, and fourth torsion bars 10, 12, 68, 70.

Figure 10:
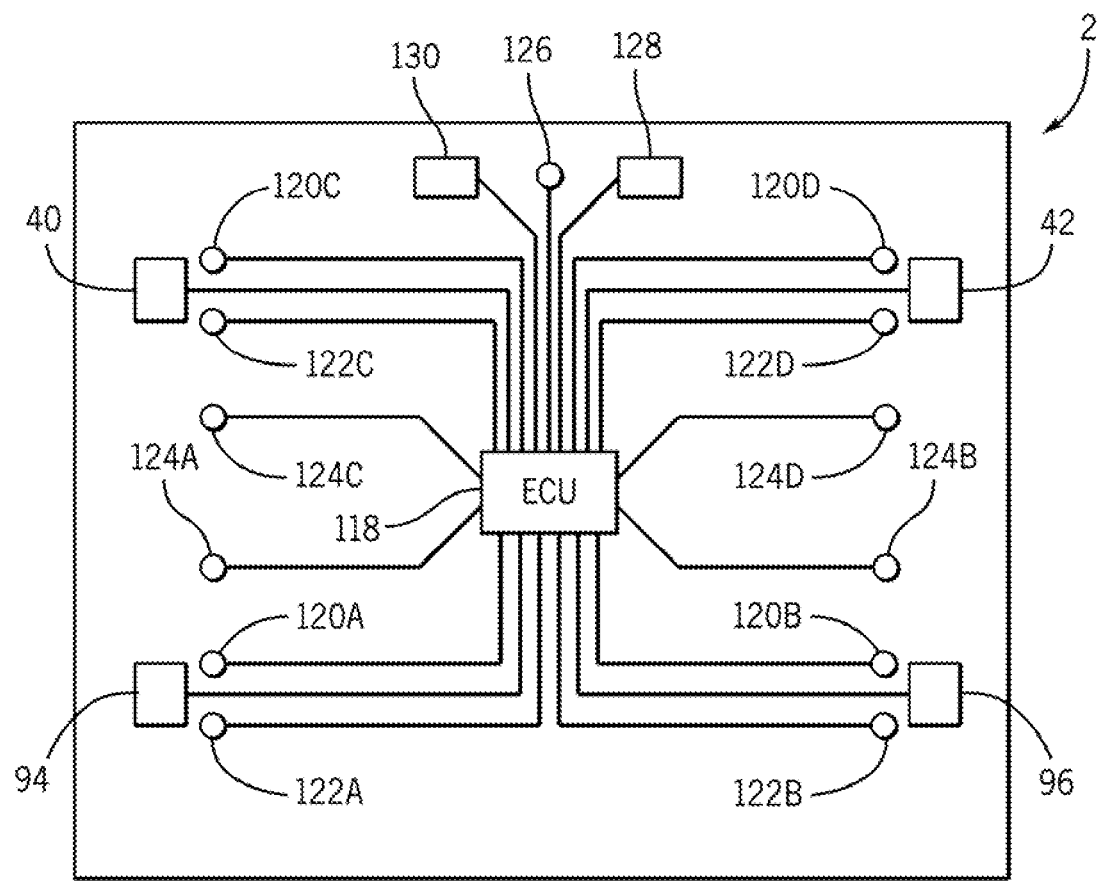
FIG. 10 is a schematic view of a vehicle including a suspension system according to the present subject matter.

The suspension system may include an electronic control unit (ECU) 118 in communication with the damper system 14 as shown in FIG. 10, and configured to control operation of the damper system 14 to selectively apply resistance to torque in the individual torsion bars 10, 12, 68, 70 that are included in the suspension system 8.

The suspension system may include one or more sensors in communication with the ECU 118 as shown in FIG. 10 for providing sensor data to the ECU 118 relative to the vehicle 2, the frame 4, the wheels 6, and the suspension system 8. This sensor data may be utilized by the ECU 118, along with the level of resistance being applied by the damper system 14 to the individual torsion bars, for controlling operation of the damper system 14 to selectively apply resistance to the torque in the individual torsion bars produced by movement of the wheel suspensions in their suspensions strokes. In other words, the ECU may apply the resistance to each of the individual torsion bars 10, 12, 68, 70 in a variable amount, and the variable amount may be determined as a function of this sensor data and the level of resistance being applied by the damper system 14 to the other of the individual torsion bars. The sensor data may include any of an angular position of each of the torsion bars 10, 12, 68, 70 as well as the overall torque/torsion in each of the torsion bars; a position of the wheel suspensions 20, 28, 76, 84 in each of their respective suspension strokes; a steering input to the vehicle 2; an angular velocity of the vehicle 2; or other sensor data.

The sensors may include two angle encoders 120, 122 on each torsion bar for determining the angular position of each of the torsion bars. As depicted in FIGS. 1-2, each torsion bar includes a first angle encoder 120A-D positioned at or near the resistive devices 40, 42, 94, 96, and a second angle encoder 122A-D positioned between the first end and the second end of each torsion bar. The angle encoders 120,122 may be in communication with the ECU 118 to provide to the ECU 118 an angular position of the torsion bar at the two location where the angle encoder are arranged on the torsion bar. A difference between the two angular positions of the two locations on the torsion bar may indicate the overall torque/torsion of each torsion bar.

The sensors may include suspension sensors 124A-D for determining the position of the wheel suspensions 20, 28, 76, 84 in each of their respective suspension strokes.

The sensors may include a steering input sensor 126 for determining the steering input to the vehicle 2, e.g. the input generated by an operator of the vehicle 2 and which causes the wheels of the vehicle 2 to change their travel direction. This sensed steering input may be used to determine that the vehicle is traveling in a straight line or is performing a turning maneuver. Resistance applied to the torsion bars 10, 12, 68, 70 by the damper system 14 may be dependent in part, on the steering input being over or under a steering input threshold. The steering input threshold may be preselected by a vehicle manufacturer in the control logic, or may be user selected, or may change based on a speed of the vehicle 2. If the steering input is above the steering input threshold, thus indicating a turning maneuver, the damper system 14 may apply resistance to torque in one or more of the torsion bars 1,0 12, 68, 70 based on the control logic, or may apply no resistance if the steering input is below the steering input threshold.

The sensors may include a gyrometer 128 for determining the angular velocity of the vehicle 2 as gyrometer measurement, and specifically for an angular velocity around a vertical axis of the vehicle 2. This sensed gyrometer measurement may be used to determine that the vehicle 2 is traveling in a straight line or is performing a turning maneuver, or for determining that the vehicle 2 is on an inclined surface. Resistance applied to the torsion bars 10, 12, 68, 70 by the damper system 14 may be dependent in part, on the gyrometer measurement being over or under a gyrometer measurement threshold. The gyrometer measurement threshold may be preselected by a vehicle manufacturer in the control logic, or may be user selected, or may change based on a speed of the vehicle 2. If the gyrometer measurement is above the gyrometer measurement threshold, thus indicating a turning maneuver, the damper system 14 may apply resistance to torque in one or more of the torsion bars 10, 12, 68, 70 based on the control logic, or may apply no resistance if the gyrometer measurement is below the gyrometer measurement threshold.

Other sensors may be included in the suspension system for providing other sensor data to the ECU 118 for use by the ECU 118 in controlling the damper system 14. The sensors may include an accelerometer 130 for measuring the acceleration of the vehicle 2 as an accelerometer measurement. This sensed accelerometer measurement may be used to determine that the vehicle 2 is accelerating, decelerating, or keeping a constant speed, and may be utilized by the ECU as part of the control logic for determining if resistance will be applied to one or more of the torsion bars 1,0 12, 68, 70.

The ECU 118 may coordinate the operation of the individual resistive devices 40, 42, 94, 96 for selectively applying a variable amount of resistance to the individual torsion bars 10, 12, 68, 70. Such coordination may be accomplished by controlling the amount of resistance applied to one of the torsion bars as a function of the amount of resistance being applied to the other torsion bars. In this way, the functioning of the resistive devices 40, 42, 94, 96 and the effect on the torsion bars 10, 12, 68, 70 can be coordinated to provide improved vehicle performance and improved occupant riding comfort. The individual resistive devices 40, 42, 94, 96 are operated in conjunction with one another, which may mean that the amount of resistance applied to one of the torsion bars 10, 12, 68, 70 is coordinated with the amount of resistance applied to the other torsion bars, by taking into account the sensor data and the amount of resistance that is applied to the other torsion bars. This operation of the individual resistive devices 40, 42, 94, 96 may cause the individual resistive devices 40, 42, 94, 96 to provide an independent suspension effect on the vehicle 2, or may cause the resistive devices 40, 42, 94, 96 to provide a collective suspension effect on the vehicle 2.

The selectively applied resistance may allow the first pair of torsion bars 10, 12 and the second pair of torsion bars 68, 70 to collectively provide similar forces to the vehicle 2 as would a conventional sway bar, or may operate to provide an independent and active variable spring rate for each of the wheel suspension 20, 28, 76, 84.

The coordination of the operation of the resistive devices will be explained further with references to FIGS. 3-9, which depict the rear axle of the vehicle 2 including the first and second resistive devices 40, 42. It will be appreciated that the described operation of the suspension system for the rear axle can be similarly applied to the front axles including the third and fourth resistive devices 94, 96, and in conjunction with operation of the suspension system for the front axle including the first and second resistive devices 40, 42.

As depicted in FIG. 3, two wheel suspensions 20, 28 are positioned near a midpoint in their suspension strokes. This arrangement may be realized when the vehicle 2 is parked or is traveling at a relatively constant speed in a straight line direction. In this scenario, the first and second resistive devices 40,42 may apply no resistance or only a minimal amount of resistance to the respective torsion bars 10, 12 because the wheel suspensions 20, 28 are not moving in their suspension strokes, and thus do not produce torque in the torsion bars 10, 12. The resistive devices 40, 42 may not apply resistance to the torsion bars 10, 12 because of the stationary position of the first and second wheel suspensions 20, 28, and because of the straight line travel of the vehicle 2.

In FIG. 4, both wheel suspensions 20, 28 have moved up from their midpoint and towards a top of their suspension strokes as indicated by the up arrows. This movement may occur during a straight line travel of the vehicle 2 and as a result of both wheels 6A, 6B hitting a bump, and may produce a torque in the torsion bars 10, 12. In this scenario, the first and second resistive devices 40, 42 may apply no resistance or only a minimal amount of resistance to the torque produced in the respective torsion bars 10, 12. The resistive devices 40, 42 may not apply resistance to their respective torsion bars 10, 12 because of the corresponding upward movement of both of the wheel suspensions 20, 28, and because of the straight line travel of the vehicle 2. This operation of the resistive devices 40, 42 may allow the wheel suspensions 20, 28 to freely move all the way up in their suspension strokes and thereby more fully absorb the impact forces acting upon the wheels suspensions 20, 28 from the bump. This operation of the wheel suspensions 20, 28 may minimize the effect of the bump on moving the frame 4, which minimized movement of the frame 4 may provide increased comfort for occupants of the vehicle 2 because the occupants experience minimum effects from the bump. In this scenario, the spring rates of the wheel suspensions 20, 28 may correspond to the spring rates of the springs 56, 66, and may be independent from the effects of the resistive devices 40, 42.

In FIG. 5, both wheel suspensions 20, 28 have moved down from their midpoint and towards a bottom of their suspension strokes as indicated by the down arrows. This movement may occur during a straight line travel of the vehicle 2 and as a result of both wheels 6A, 6B encountering a hole, and may produce a torque in the torsion bars 10, 12. In this scenario, the first and second resistive devices 40, 42 may apply no resistance or only a minimal amount of resistance to the torque produced in the respective torsion bars 10, 12. The resistive devices 40, 42 may not apply resistance to their respective torsion bars 10, 12 because of the corresponding downward movement of both of the wheel suspensions 20, 28, and because of the straight line travel of the vehicle 2. This operation of the resistive devices 40, 42 may allow the wheel suspensions 20, 28 to freely move all the way down in their suspension strokes and thereby fully engage the wheels 6A, 6B to the hole. This operation of the wheel suspensions 20, 28 may minimize the effect of the hole on moving the frame 4, which minimized movement of the frame 4 may provide increased comfort for occupants of the vehicle 2 because the occupants experience minimum effects from the hole. In this scenario, the spring rates of the wheel suspensions 20, 28 may correspond to the spring rates of the springs 56, 66, and may be independent from the effects of the resistive devices 40, 42.

In FIG. 6, only the second wheel suspensions 28 has moved up from its midpoint and towards a top of its suspension stroke as indicated by the up arrow; while the first wheel suspension 20 has remained near the midpoint of its suspension stroke. This movement of the second wheel suspensions 28 and the lack of movement in the first wheel suspension 20 may occur during a straight line travel of the vehicle 2 and as a result of only the second wheel 6B hitting a bump, which movement may produce a torque in the second torsion bars 12. The first wheel suspension 20 is not moving in its suspension stroke, and thus does not produce torque in the first torsion bars 10. In this scenario, the second resistive device 42 may apply no resistance or only a minimal amount of resistance to the torque produced in the second torsion bar 12, and the first resistive device 40 may also apply no resistance or only a minimal amount of resistance to the first torsion bar 10. This functioning may allow the wheel suspensions 20, 28 to freely move in their suspension strokes and independently from one another, such that the second wheel suspension 28 can thereby freely move all the way up in its suspension stroke to fully absorb the impact forces acting upon the second wheels suspension 28 from the bump. The second resistive device 42 may not apply resistance to the second torsion bar 12 because of the stationary position of the first wheel suspension 20, and because of the straight line travel of the vehicle 2. This functioning can be similarly applicable in the opposite scenario, where the first wheel 6A encounters a bump while the second wheel 6B does not. This operation of the wheel suspensions 20, 28 may minimize the effect of the bump on moving the frame 4, which minimized movement of the frame 4 may provide increased comfort for occupants of the vehicle 2 because the occupants experience minimum effects from the bump. In this scenario, the spring rates of the wheel suspensions 20, 28 may correspond to the spring rates of the springs 56, 66, and may be independent from the effects of the resistive devices 40, 42.

Figure 7:
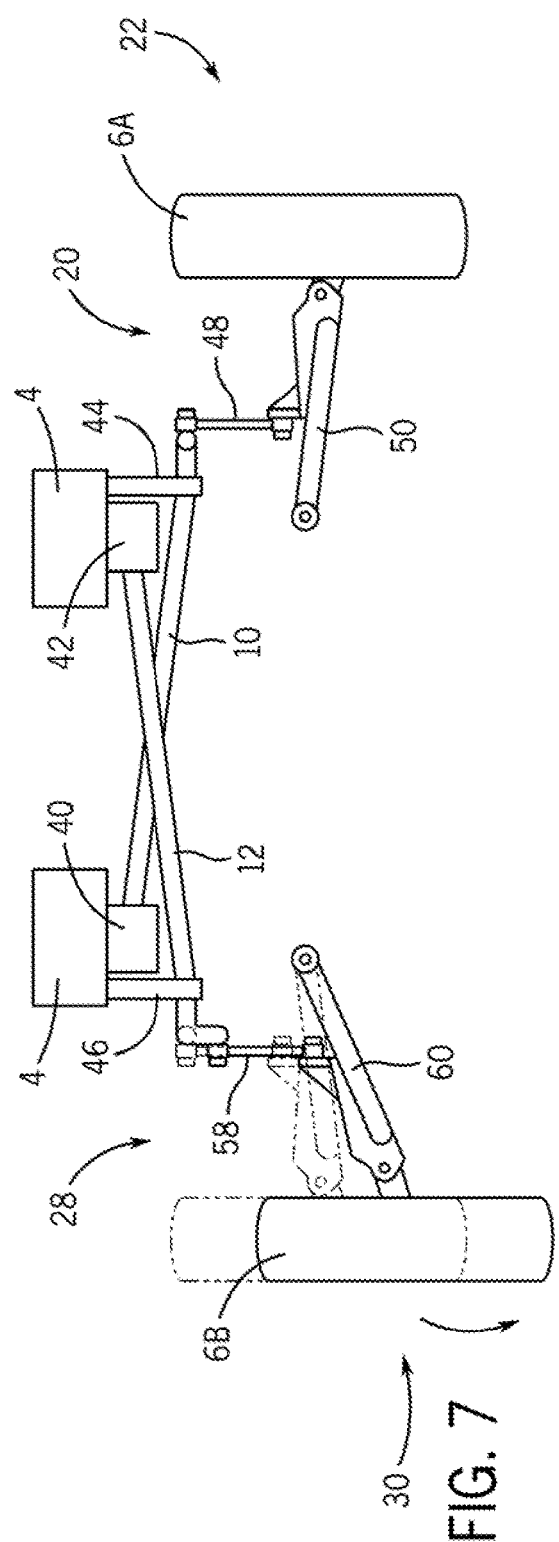
FIG. 7 is another front view of the rear portion of the suspension system of FIG. 3.

In FIG. 7, only the second wheel suspensions 28 has moved down from its midpoint and towards a bottom of its suspension stroke as indicated by the down arrow; while the first wheel suspension 20 has remained near the midpoint of its suspension stroke. This movement of the second wheel suspensions 28 and the lack of movement in the first wheel suspension 20 may occur during a straight line travel of the vehicle 2 and as result of only the second wheel 6B encountering a hole, which movement may produce a torque in the second torsion bars 12. The first wheel suspension 20 is not moving in its suspension stroke, and thus does not produce torque in the first torsion bars 10. In this scenario, the second resistive device 42 may apply no resistance or only a minimal amount of resistance to the torque produced in the second torsion bar 12, and the first resistive device 40 may also apply no resistance or only a minimal amount of resistance to the first torsion bar 10. This functioning may allow the wheel suspensions 20, 28 to freely move in their suspension strokes and independently from one another, such that the second wheel suspension 28 can thereby freely move all the way down to thereby fully engage the second wheel 6B to the hole. The second resistive device 42 may not apply resistance to the second torsion bar 12 because of the stationary position of the first wheel suspension 20, and because of the straight line travel of the vehicle 2. This functioning can be similarly applicable in the opposite scenario, where the first wheel 6A encounters a hole while the second wheel 6B does not. This operation of the resistive devices 40, 42 may allow the wheel suspensions 20, 28 to freely move all the way up in their suspension strokes and thereby more fully absorb the impact forces acting upon the wheels suspensions 20, 28 from the bump. This operation of the wheel suspensions 20, 28 may minimize the effect of the hole on moving the frame 4, which minimized movement of the frame 4 may provide increased comfort for occupants of the vehicle 2 because the occupants experience minimum effects from the bump. In this scenario, the spring rates of the wheel suspensions 20, 28 may correspond to the spring rates of the springs 56, 66, and may be independent from the effects of the resistive devices 40, 42.

Figure 8:
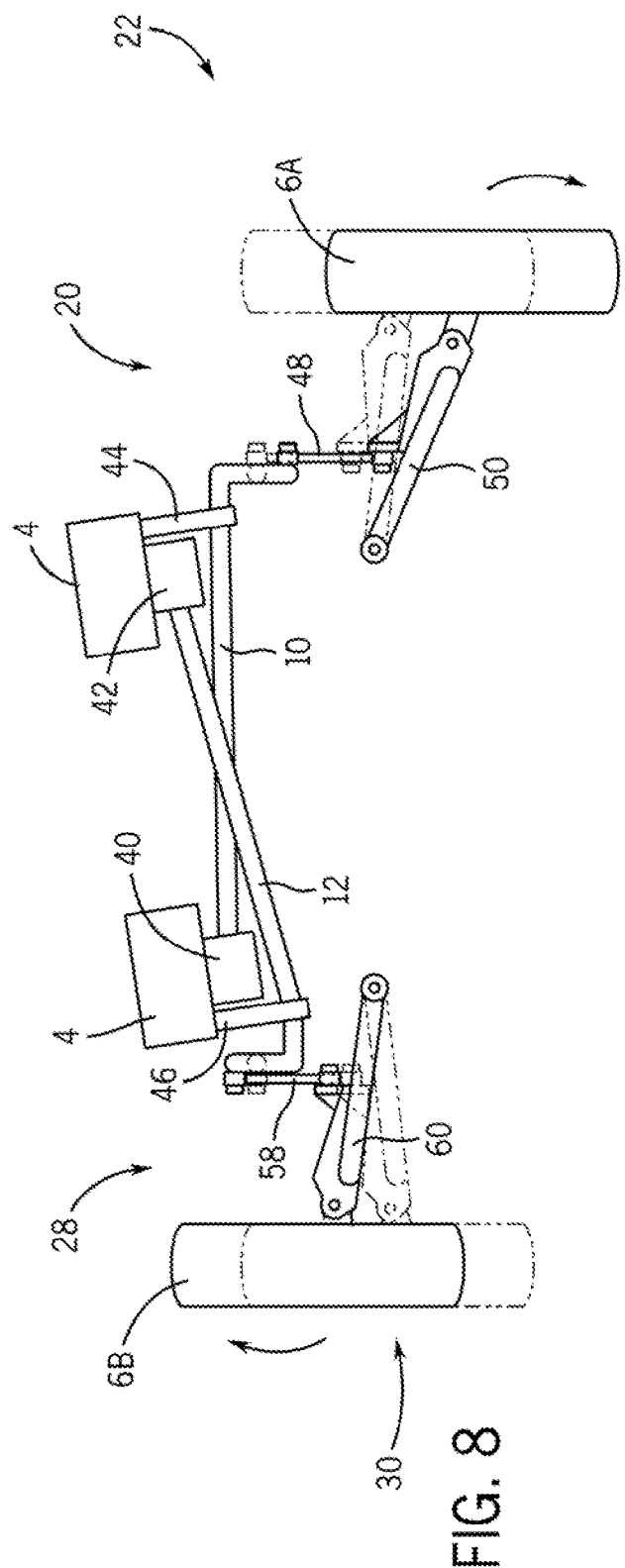
FIG. 8 is another front view of the rear portion of the suspension system of FIG. 3.

In FIG. 8, the second wheel suspensions 28 has moved up from its midpoint and towards a top of its suspension stroke as indicated by the up arrow; while the first wheel suspension 20 has moved down from its midpoint and towards a bottom of its suspension stroke as indicated by the down arrow. This opposite movement of the wheel suspensions 20, 28 may be as a result of the vehicle 2 executing a turning maneuver, resulting in a shifting of the weight of the vehicle (i.e. "vehicle roll") onto the second wheel suspension 28 to compress it, and off of the first wheel suspension 20 to expand it, and may produce torque in both of the first and second torsion bars 10, 12. In this scenario, the first resistive device 40 may apply resistance to the torque in the first torsion bar 10, and the second resistive device 42 may apply resistance to the torque in the second torsion bar 12. The resistance applied to the first and second torsion bars 10, 12 may counter the vehicle roll by inhibiting the second wheel suspensions 28 from moving up in its suspension stroke toward maximum compression, and by inhibiting the first wheel suspension 20 from moving down in its suspension stroke toward full rebound. The amount of resistance applied to the first torsion bar 10 may be varied by gradually increasing the resistance as the first wheel suspension 20 moves further down in its suspension stroke and further away from its midpoint, and gradually decreasing the resistance as the first wheel suspension 20 moves closer to its midpoint in the suspension stroke. The amount of resistance applied to the second torsion bar 12 may be varied by gradually increasing the resistance as the second wheel suspension 28 moves further up in its suspension stroke and further away from its midpoint, and gradually decreasing the resistance as the first wheel suspension 20 moves closer to its midpoint in the suspension stroke. The amount of resistance applied to the first and second torsion bars 10, 12 may also be gradually increased as the vehicle 2 accelerates and decreased as the vehicle 2 decelerates. This gradual increase or decrease in the resistance applied to the torsion bars 10, 12 may provide progressive resistance to movement of the wheel suspensions, and may provide an active spring rate for the springs in the wheel suspensions. The resistive devices 40, 42 may apply resistance to the respective torsion bars 10, 12 because of the opposite movement of the first and second wheel suspensions 20, 28 and because of the turning maneuver performed by the vehicle 2. This functioning can be similarly applicable in the opposite scenario as depicted in FIG. 9, where the first wheel suspension 20 is compressed and the second wheel suspension 28 is expanded from vehicle roll.

This opposite movement of the wheel suspensions 20, 28 as depicted in FIG. 8, may also occur during straight line travel of the vehicle 2, and as a result of the second wheel 6B hitting a bump while the first wheel 6A encounters a hole. In this scenario, the first and second resistive devices 40, 42 may apply no resistance or only a minimal amount of resistance to the torque produced in the respective torsion bars 10, 12 in order to allow the wheel suspensions 20, 28 to freely move up and down, respectively, in their suspension strokes, and to thereby allow the second wheel suspension 28 to fully absorb the impact forces from the bump and to allow the first wheel 6A to fully engage the hole. The resistive devices 40, 42 may not apply resistance to their respective torsion bars 10, 12 because of the opposite movement of the wheel suspensions 20, 28, and because of the straight line travel of the vehicle 2. This functioning can be similarly applicable in the opposite scenario as depicted in FIG. 9, where the first wheel 6A encounters a bump while the second wheel 6B encounters a hole.

Figure 9:
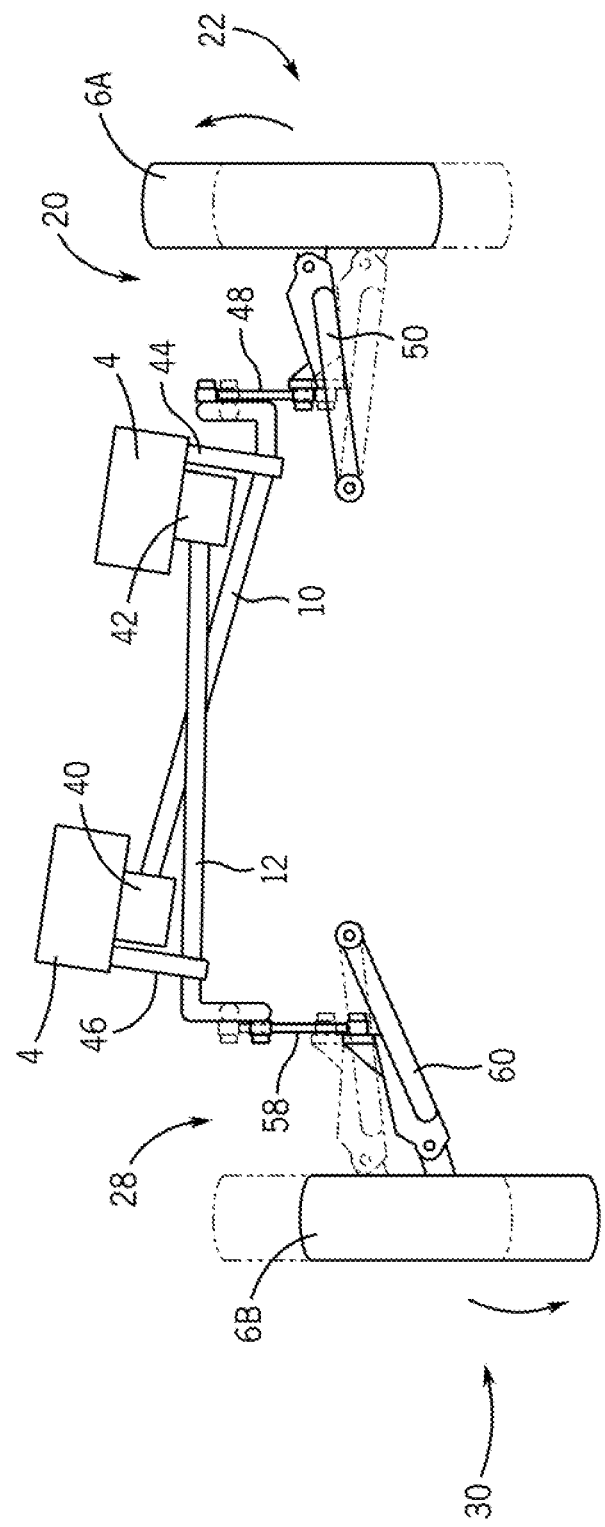
FIG. 9 is another front view of the rear portion of the suspension system of FIG. 3.

This operation of the wheel suspensions 20, 28 as described for FIGS. 8 and 9 may affect the spring rates of the wheel suspensions 20, 28, whereby operation of the resistive devices 40, 42 may effectively increase the spring rates of the wheel suspensions 20, 28. This may cause the spring rates of the wheel suspensions 20, 28 to be dependent on the spring rates of the springs 56, 66 and on the operation of the resistive devices 40, 42. This operation of the resistive devices 40, 42 may allow the first and second torsion bars 10, 12 to collectively act, as would a conventional sway bar, to inhibit roll of the frame 4 and vehicle 2 during movement of the vehicle 2 in the turning maneuver. By selectively varying the amount of resistance applied to torque in each of the torsion bars 10, 12, 68, 70, the suspension system effectively provides an active variable spring rate to each of the wheel suspensions 20, 28, 76, 84, thus providing improved vehicle performance, occupant comfort, and inhibition to vehicle roll.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A suspension system for a vehicle, the suspension system including a first torsion bar, a second torsion bar, and a damper system, wherein:
a first end of the first torsion bar is connected to a first wheel suspension of the vehicle, such that movement of the first wheel suspension in a first wheel suspension stroke produces torque in the first torsion bar;
a second end of the first torsion bar is connected to the damper system;
a first end of the second torsion bar is connected to a second wheel suspension of the vehicle, such that movement of the second wheel suspension in a second wheel suspension stroke produces torque in the second torsion bar;
a second end of the second torsion bar is connected to the damper system;
the damper system selectively applies resistance to the torque in the first and second torsion bars to selectively provide active variable spring rates to the first and second wheel suspensions; and
the resistance is applied in a variable amount to each of the first and second torsion bars as a function of:
a position of the first wheel suspension in the first wheel suspension stroke,
a position of the second wheel suspension in the second wheel suspension stroke,
steering input to the vehicle,
a gyrometer measurement for the vehicle,
an accelerometer measurement for the vehicle,
angular positions of the first and second torsion bars, and
an amount of the resistance applied to the other of the first and second torsion bars.

2. The suspension system according to claim 1, wherein the damper system does not apply the resistance if the steering input is below a steering input threshold, and the gyrometer measurement is below a gyrometer measurement threshold for an angular velocity around a vertical axis of the vehicle.

3. The suspension system according to claim 1, wherein the damper system applies the resistance if the steering input is above a steering input threshold, and the gyrometer measurement is above a gyrometer measurement threshold for an angular velocity around a vertical axis of the vehicle.

4. The suspension system according to claim 1, wherein the angular positions of the first and second torsion bars are determined using angle encoders arranged on the first and second torsion bars.

5. The suspension system according to claim 4, wherein:
the angle encoders include a first angle encoder, a second angle encoder, a third angle encoder, and a fourth angle encoder;
the first angle encoder is arranged at the first end of the first torsion bar;
the second angle encoder is arranged at the second end of the first torsion bar;
the third angle encoder is arranged at the first end of the second torsion bar; and
the fourth angle encoder is arranged at the second end of the second torsion bar.

6. The suspension system according to claim 1, wherein:
the damper system includes a first resistive device and a second resistive device;
the second end of the first torsion bar is connected to a frame of the vehicle through the first resistive device; and
the second end of the second torsion bar is connected to the frame through the second resistive device.

7. The suspension system according to claim 6, wherein:
the first torsion bar is attached to the frame of the vehicle by a first bearing;
the first bearing is arranged on the first torsion bar between the first end and the second end of the first torsion bar;
the second torsion bar is attached to the frame by a second bearing; and
the second bearing is arranged on the second torsion bar between the first end and the second end of the second torsion bar.

8. The suspension system according to claim 6, wherein:
the first wheel suspension is arranged on a first lateral side of the vehicle;
the first resistive device is arranged on a second lateral side of the vehicle opposite from the first lateral side;
the second wheel suspension is arranged on the second lateral side;
the second resistive device is arranged on the first lateral side.

9. The suspension system according to claim 1, wherein the damper system includes an electronic motor, hydraulic damper, valving, or a clutch pack.

10. A vehicle including a frame, a first wheel suspension arranged on a first lateral side of the frame, a second wheel suspension arranged on a second lateral side of the frame opposite from the first lateral side, and a suspension system connecting the first wheel suspension and the second wheel suspension to the frame, the suspension system including a first torsion bar, a second torsion bar, and a damper system, wherein:
a first end of the first torsion bar is connected to the first wheel suspension of the vehicle, such that movement of the first wheel suspension in a first wheel suspension stroke produces torque in the first torsion bar;
a second end of the first torsion bar is connected to the damper system;
a first end of the second torsion bar is connected to the second wheel suspension of the vehicle, such that movement of the second wheel suspension in a second wheel suspension stroke produces torque in the second torsion bar;
a second end of the second torsion bar is connected to the damper system;

the damper system selectively applies resistance to the torque in the first and second torsion bars to provide active variable spring rates to the first and second wheel suspensions; and the resistance is applied in a variable amount to each of the first and second torsion bars as a function of:
- a position of the first wheel suspension in the first wheel suspension stroke,
- a position of the second wheel suspension in the second wheel suspension stroke,
- steering input to the vehicle,
- a pyrometer measurement for the vehicle,
- an accelerometer measurement for the vehicle,
- angular positions of the first and second torsion bars, and
- an amount of the resistance applied to the other of the first and second torsion bars.

11. The vehicle according to claim 10, wherein the damper system does not apply the resistance if the steering input is below a steering input threshold, and the gyrometer measurement is below a gyrometer measurement threshold for an angular velocity around a vertical axis of the vehicle.

12. The vehicle according to claim 10, wherein the damper system applies the resistance if the steering input is above a steering input threshold, and the gyrometer measurement is above a gyrometer measurement threshold for an angular velocity around a vertical axis of the vehicle.

13. The vehicle according to claim 10, further including angle encoders arranged on the first and second torsion bars, wherein the angular positions of the first and second torsion bars are determined using the angle encoders.

14. The vehicle according to claim 13, wherein:
the angle encoders include a first angle encoder, a second angle encoder, a third angle encoder, and a fourth angle encoder;
the first angle encoder is arranged at the first end of the first torsion bar;
the second angle encoder is arranged at the second end of the first torsion bar;
the third angle encoder is arranged at the first end of the second torsion bar; and
the fourth angle encoder is arranged at the second end of the second torsion bar.

15. The vehicle according to claim 10, wherein:
the damper system includes a first resistive device and a second resistive device;
the second end of the first torsion bar is connected to the frame of the vehicle through the first resistive device; and
the second end of the second torsion bar is connected to the frame through the second resistive device.

16. The vehicle according to claim 15, further including:
a first bearing arranged on the first torsion bar between the first end and the second end of the first torsion bar, the first torsion bar being attached to the frame by the first bearing; and
a second bearing arranged on the second torsion bar between the first end and the second end of the second torsion bar, the second torsion bar being attached to the frame by the second bearing.

17. The vehicle according to claim 15, wherein:
the first resistive device is arranged on the second lateral side; and
the second resistive device is arranged on the first lateral side.

18. The vehicle according to claim 10, wherein the damper system includes an electronic motor, hydraulic damper, valving, or a clutch pack.

* * * * *